Sept. 1, 1953 J. FAULDS 2,650,554
BAKE OVEN
Filed Dec. 2, 1949 3 Sheets-Sheet 2

INVENTOR.
John Faulds
BY Mann and Brown
Attys

Sept. 1, 1953  J. FAULDS  2,650,554
BAKE OVEN

Filed Dec. 2, 1949  3 Sheets-Sheet 3

INVENTOR.
John Faulds
BY Mann and Brown
Attys.

Patented Sept. 1, 1953

2,650,554

UNITED STATES PATENT OFFICE 2,650,554

BAKE OVEN

John Faulds, Oak Park, Ill., assignor to Faulds Oven and Equipment Co., Chicago, Ill., a corporation of Illinois Application December 2, 1949, Serial No. 130,827

4 Claims. (Cl. 107—60)

This invention relates to bake ovens, and has for its principal object to increase the capacity and efficiency of ovens and make them more adaptable.

Generally speaking, this is accomplished by providing a baking chamber with tiers of open pan racks arranged to rotate about a substantially vertical axis.

But these diagrammatic drawings and the corresponding description are used for the purpose of disclosure only, and are not intended to impose unnecessary limitations on the claims.

The baking chamber 10 is enclosed by a casing composed of four side walls 11, a bottom 12, and a top 13 of suitable material including efficient insulation.

Figure 1:
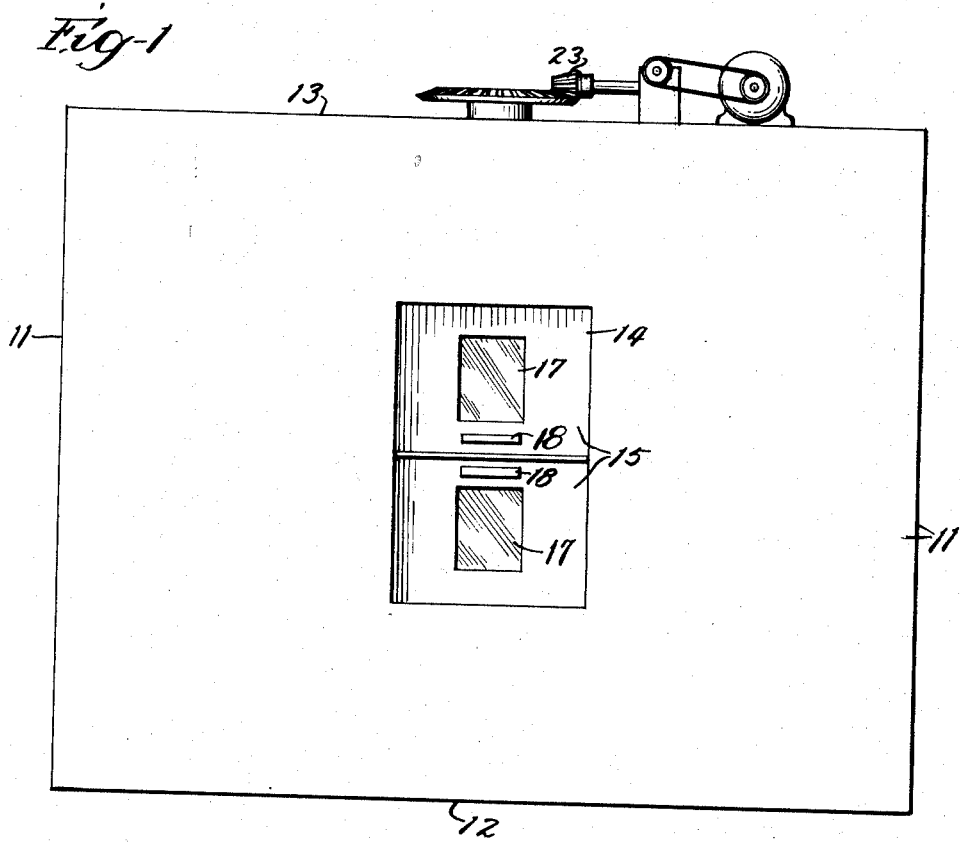
Fig. 1 is a front elevation of an oven embodying the invention.
Figure 2:
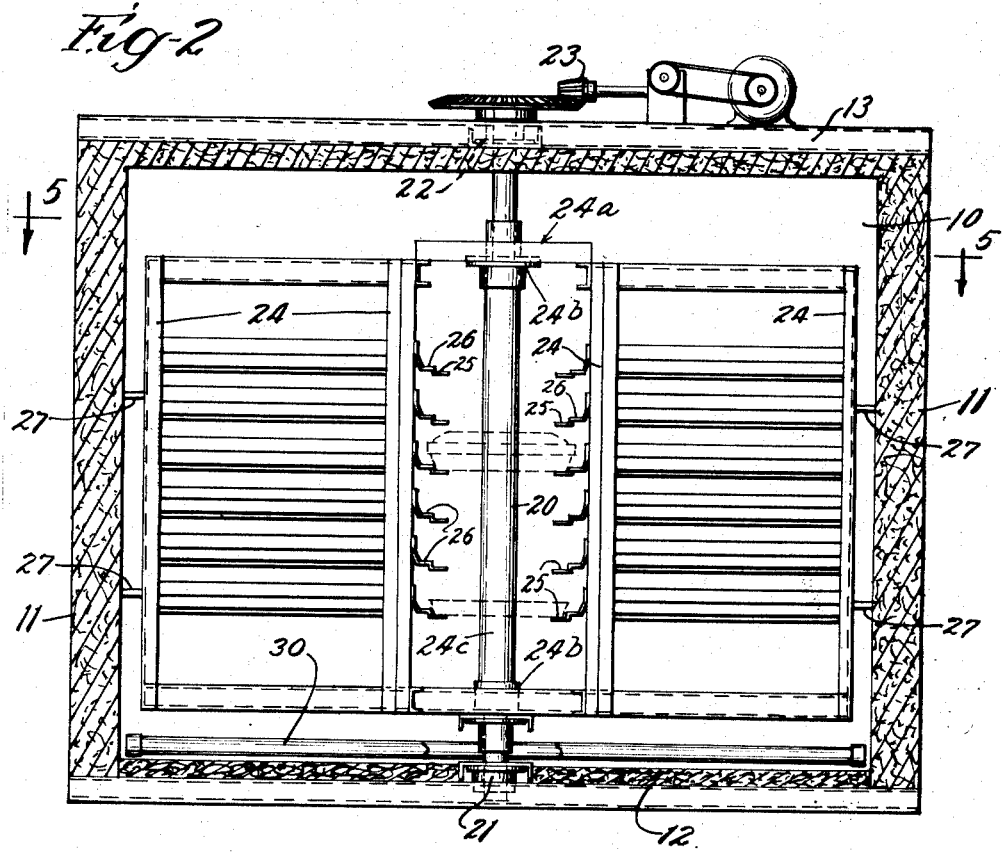
Fig. 2 is a vertical section.
Figure 5:
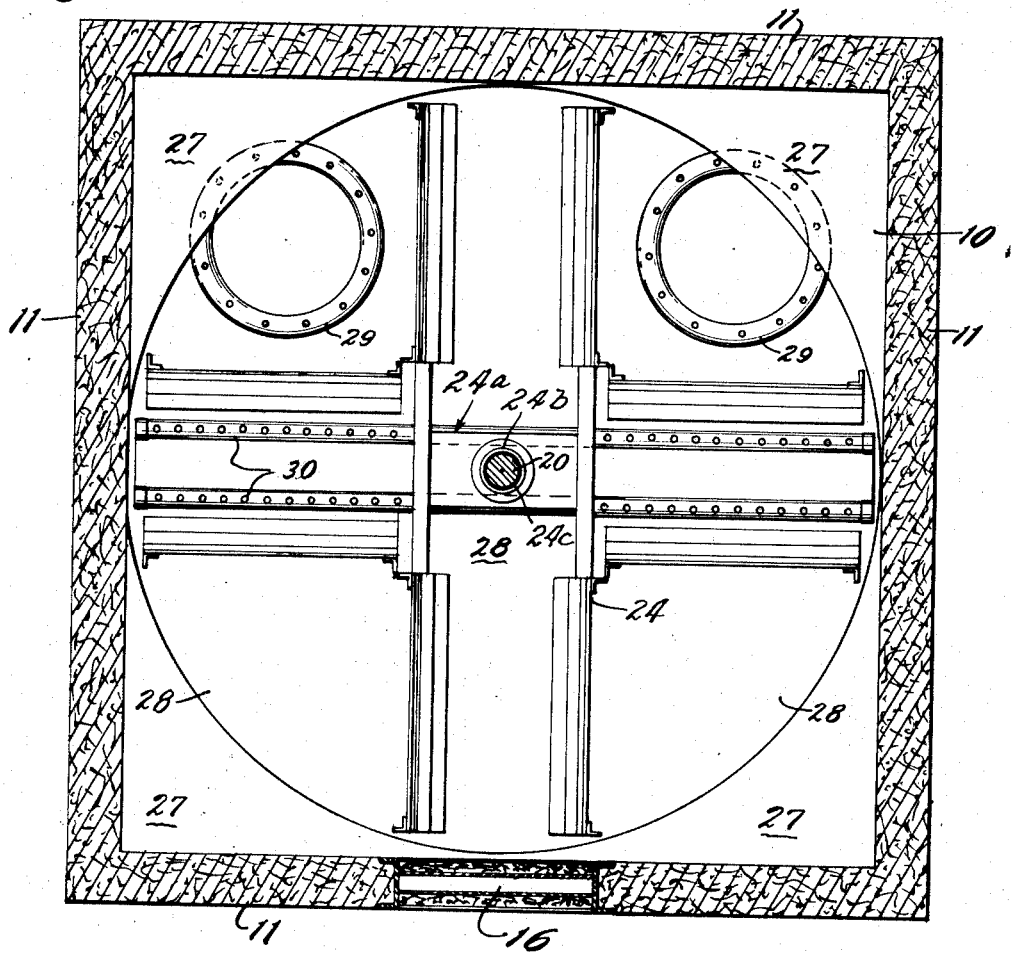
Fig. 5 is a horizontal section on the line 5—5 of Fig. 2.

One of the side walls, as shown in Fig. 1, is provided with an opening 14 for charging and discharging. It is closed by twin doors 15 moving in unison in suitable chambers 16 (Fig. 5) in the wall to provide access to the baking chamber, or close it, as occasion may require. Each door 15 is fitted with an inspection glass 17 and a handle 18.

A vertical shaft 20, journalled in bearings 21 and 22, is arranged in the midportion of the baking chamber, and arranged to be driven by suitable mechanism 23.

Supported on the shaft 20 are tiers of pan racks 24, here shown as four in number, arranged after the fashion of a Maltese cross. The pan racks 24 are welded or otherwise suitably secured to a substantially H-shaped framework 24a mounted on vertically spaced collars 24b secured on a sleeve 24c. The sleeve 24c, in turn, is secured on the shaft 20 for rotation therewith.

Figure 3:
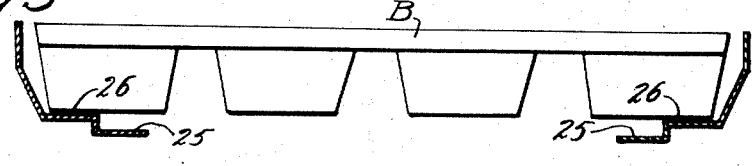
Fig. 3 is a side elevation of a pan set in one of the tiers of racks.
Figure 4:
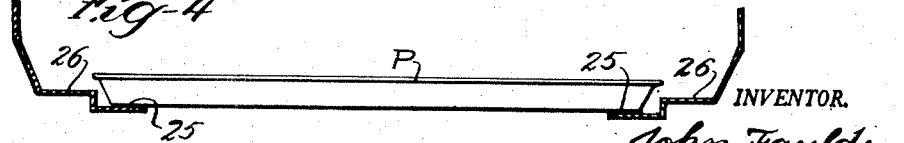
Fig. 4 is a side elevation of a standard bakers' pan on one of the racks.

Each of the racks is formed of two metal members having stepped pan seats 25, 26, especially adapted to receive standard pan sets and standard bakers' pans substantially as shown in Figs. 3 and 4.

In use, the oven will be charged by opening the doors 15 and inserting pans on a tier of pan supports facing the door opening 14. Then, by rotation a quarter of a turn or half a turn, another tier will be charged. Often it will be convenient to remove the baked bread or the like from a tier and charge it again before moving the tier to a different position.

The corner portions of the chamber 27 and the central portion of the rack assembly 28 are provided with suitable baffles of a conventional type to control the flow of heat.

Circular gas burners 29, or straight burners 30, or a combination of the two, may be conveniently located in the lower part of the baking chamber beneath the bottom racks.

In one form that has been found satisfactory, the casing is 8' 11¾" square and 7' high, outside dimensions. The door is 36" high, 24" wide. Each of the four tiers includes six racks spaced approximately 6" on centers.

Figure 6:
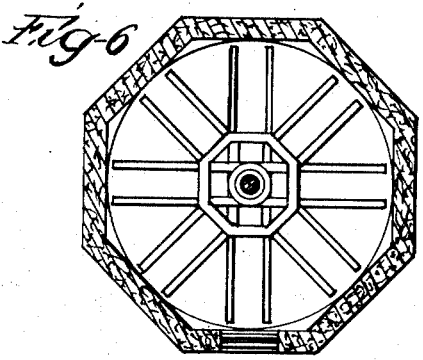
Fig. 6 is a similar view showing a modified form.

This arrangement provides space for 80 more loaves of bread than present ovens of the same dimensions. Its capacity can be doubled by providing more tiers 24, such, for example, as 8, as shown in Fig. 6, which will require but very small increase in the size of the chamber.

The arrangement of the racks and tiers makes the oven adaptable for general baking of such goods as bread, cakes, and pies, and also for roasting turkeys and large pieces of meat. The space between the pan supports provides ample clearance for turkeys and large roasts.

The door opening 14 is very small as compared with the door openings in prior ovens of even less capacity, which results in a much less loss of heat during the charging and discharging operations.

I claim:

1. In a bake oven, a casing enclosing a baking chamber having a charging opening, an upright rotary support in said chamber, and tiers of pan racks extending outward from and supported by said rotary support, each of said pan racks comprising a pair of spaced apart parallel pan-supporting members of stepped cross-section to receive and locate selectively pans of different widths.

2. The invention in accordance with claim 1 in which said tiers of pan racks are eight in number and disposed about said rotary support in angular relation to one another.

3. In a bake oven, a casing enclosing a baking chamber having a charging opening, an upright rotary support in said chamber, and tiers of pan racks extending outward from and supported by said rotary support, each of said pan racks comprising a pair of spaced apart parallel pan-supporting members to receive and locate pans of different widths, said tiers of pan racks being eight in number and disposed about said rotary support in angular relation to one another.

4. In a bake oven, a casing enclosing a baking chamber having a charging opening, an upright rotary support in said chamber, tiers of open pan racks extending outward from and supported by said rotary support and movable to a position opposite said charging opening, each of said pan racks comprising vertically spaced pairs of horizontally spaced substantially parallel members having flanged pan-supporting portions carried thereby to receive and locate pans, and each of said members being secured at their inner ends to said rotary support, whereby pans of different sizes may be supported between each pair of parallel members.

JOHN FAULDS.

References Cited in the file of this patent
UNITED STATES PATENTS

| Number | Name | Date |
|---|---|---|
| 50,736 | Sanders | Oct. 3, 1865 |
| 1,278,200 | Osborne | Sept. 10, 1918 |
| 1,384,406 | Reid | July 12, 1921 |
| 1,485,173 | Eaton et al. | Feb. 26, 1924 |
| 1,771,885 | Faulds | July 29, 1930 |
| 1,786,142 | Wyman | Dec. 23, 1930 |
| 1,941,792 | Faulds | Jan. 2, 1934 |